(12) United States Patent
Yamada

(10) Patent No.: US 6,233,519 B1
(45) Date of Patent: May 15, 2001

(54) CAR-MOUNTED EQUIPMENT

(75) Inventor: Toyoshi Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,785

(22) Filed: Aug. 3, 1999

(30) Foreign Application Priority Data

Aug. 7, 1998 (JP) .................................................. 10-224533

(51) Int. Cl.$^7$ ...................................................... G06G 7/78
(52) U.S. Cl. ............................ 701/200; 340/988; 342/42; 342/46
(58) Field of Search .................................... 701/200, 207, 701/211, 213; 340/988, 990, 995; 342/42, 46

(56) References Cited

U.S. PATENT DOCUMENTS

| | | | |
|---|---|---|---|
| 5,485,520 | * | 1/1996 | Chaum ...................................... 380/24 |
| 5,490,079 | * | 2/1996 | Sharpe et al. ......................... 701/213 |
| 5,508,917 | * | 4/1996 | Siegle et al. .......................... 701/207 |
| 5,694,322 | * | 12/1997 | Westerlage et al. ............. 340/870.07 |

* cited by examiner

*Primary Examiner*—William A. Cuchlinski, Jr.
*Assistant Examiner*—Yonel Beaulieu
(74) *Attorney, Agent, or Firm*—Sughrue, Mion, Zinn, Macpeak & Seas, PLLC

(57) ABSTRACT

A car-mounted equipment in which an ETC car-mounted unit and a navigation system work integrally together to share the data, making it possible to diversify the functions, to enhance the precision and to improve the reliability. The car-mounted equipment has an ETC car-mounted unit 11 which executes transmission and reception to and from an ETC on-the-road equipment to at least recognize that the vehicle is approaching or passing through a toll gate, a navigation system 12 which receives electromagnetic waves from a satellite to recognize the absolute position of the vehicle and informs the driver of at least the position of the vehicle by displaying data or by producing voice data, and a data bus 14 which connects the ETC car-mounted unit and the navigation system together so that they work integrally together, wherein the ETC car-mounted unit and the navigation system transmit and receive data to and from each other through the data bus.

9 Claims, 14 Drawing Sheets

FIG. 6

TOLL TABLE — M20

| | \multicolumn{5}{c}{TOLL GATE AT THE EXIT} |
| | TOLL GATE A | TOLL GATE B | ... | TOLL GATE Y | TOLL GATE Z |
|---|---|---|---|---|---|
| TOLL GATE AT THE ENTRANCE — TOLL GATE A | – | 100 | ... | 2400 | 2500 |
| TOLL GATE B | – | – | ... | 2300 | 2400 |
| ... | ... | ... | ... | ... | ... |
| TOLL GATE Y | – | – | ... | – | 100 |
| TOLL GATE Z | – | – | ... | – | – |

CAR-MOUNTED EQUIPMENT

BACKGROUND OF THE INVENTION

1. Field of the Invention

The present invention is concerned with a car-mounted equipment in which an ETC (nonstop toll collection system) and a navigation system work integrally together to share the data, making it possible to diversify the functions, to enhance the precision and to improve the reliability.

2. Prior Art

As car-mounted equipment, there have heretofore been known an air conditioner and audio equipment, as well as an ETC car-mounted unit that executes communication with an ETC on-the-road equipment, a navigation system and the like.

In particular, a well-known system can be represented by the navigation system which recognizes the absolute position of the vehicle relying upon the satellite communication (GPS) and informs the driver of data related to the position of the vehicle.

In recent years, furthermore, attention has been given to an ETC system installed at a toll gate (at the entrance or exit) of a toll road for collecting the tolls without stopping the vehicles, and a variety of systems have been proposed.

FIG. 13 is a plan view illustrating a conventional ETC car-mounted unit disclosed in, for example, Japanese Unexamined Patent Publication (Kokai) No. 242497/1992.

FIG. 14 is a perspective view illustrating a conventional ETC car-mounted unit together with an antenna disclosed in, for example, Japanese Unexamined Patent Publication (Kokai) No. 185548/1995.

Referring to FIG. 13 illustrating an ETC car-mounted unit 30, a display unit 31 functions as an output unit of the car-mounted unit 30, and a key pad 32 functions as an input unit of the ETC car-mounted unit 30.

Referring to FIG. 14 illustrating an ETC car-mounted unit 40, a cable 41 is guided from the ETC car-mounted unit 40, an antenna unit 42 is connected to the ETC car-mounted unit 40 through the cable 41, a display unit 43 is provided on the ETC car-mounted unit 40, unit switches 44 are provided on the ETC car-mounted unit 40, and an opening 45 works as a port for inserting an IC card (not shown) in the ETC car-mounted unit 40.

Conventional ETC car-mounted units 30 and 40 are constituted as shown in FIGS. 13 and 14, and offer, to the driver, at least the data related to that the vehicle is approaching the toll gate or is passing through the toll gate on the display units 31 and 43 based upon the data obtained by executing the communication with an ETC on-the-road equipment (not shown).

In general, the ETC car-mounted units 30 and 40 are realized in sufficiently small sizes, and their display units 31 and 43 are simply constituted by using LCD or LED. Therefore, it is not easily to make sure the contents of communication while driving.

Furthermore, the ETC car-mounted units 30 and 40 start (wake up) communication with the ETC on-the-road equipment upon receiving signals from the ETC on-the-road equipment, and cannot be driven at any timing. Unless data are received from the ETC on-the-road equipment, furthermore, the ETC car-mounted units 30 and 40 are not capable of displaying the name of the toll gate on the display units 31 and 43.

Moreover, a notice beacon for indicating that the vehicle is approaching the toll gate is used for shifting the ETC car-mounted units 30 and 40 from a low-power-consumption mode to a normal mode. Unless the notice beacon data is received from the ETC on-the-road equipment, therefore, the ETC car-mounted units 30 and 40 cannot be shifted from the low-power-consumption mode to the normal mode.

Unless the ETC car-mounted units 30 and 40 receive data from other unit, furthermore, the vehicle drive lane cannot be guided in a detailed manner at the toll gate. Therefore, it may become necessary to greatly change the lane near the toll gate.

The data are offered only at a timing obtained through the communication with the ETC on-the-road equipment, and the data cannot be offered at a proper timing desired by the driver.

When the name of the toll gate is to be displayed on the display units of the ETC car-mounted units 30 and 40, a table in which the names of the toll gates are corresponded to the codes must be stored in the memories of the ETC car-mounted units 30 and 40, which, however, is not easy since the ETC car-mounted units 30 and 40 have small memory regions.

On the other hand, as a means for detecting the absolute position of a vehicle used for the navigation system (not shown), there has been known an autonomous navigation system which is based upon the GPS as well as the practical traveling state of the vehicle and the map data.

When the GPS is relied upon, however, it is not allowed to distinguish whether the vehicle is traveling on an elevated toll road such as an expressway or a by-pass, or a common road under the elevated road. It is not allowed to distinguish, either, whether the vehicle is traveling on the toll road such as an expressway or a by-pass, or on a side road along therewith.

According to the prior art as described above, the ETC car-mounted units 30 and 40 and the navigation system are separately used. When the ETC car-mounted units 30 and 40 are used, which are driven in response to a notice beacon from the on-the-road equipment, it is not allowed to obtain data related to the position of the vehicle at a given timing. Besides, the display units 31, 43 and the data capacities are so small that the data are not offered to a sufficient degree.

When the navigation system is used, the position at where the vehicle is traveling can be recognized at all times by using a data base of a large capacity and a relatively large display unit, leaving, however, a problem in that it is not allowed to correctly distinguish the multi-level crossings and the adjacent by-passes.

SUMMARY OF THE INVENTION

The present invention was accomplished in order to solve the above-mentioned problems, and its object is to provide a car-mounted equipment in which an ETC car-mounted unit and a navigation system work integrally together to share the data, making it possible to diversify the functions, to enhance the precision and to improve the reliability.

A car-mounted equipment according to the present invention comprises an ETC car-mounted unit which executes transmission and reception to and from an ETC on-the-road equipment to at least recognize that the vehicle is approaching or passing through a toll gate, a navigation system which receives electromagnetic waves from a satellite to recognize the absolute position of the vehicle and informs the driver of at least the position of the vehicle by displaying data or by producing voice data, and a data bus which connects said ETC car-mounted unit and said navigation system together so that they work integrally together, wherein said ETC car-mounted unit and said navigation system transmit and receive data to and from each other through said data bus so as to share said data.

In the car-mounted equipment according to the present invention, said ETC car-mounted unit executes communication with said ETC on-the-road equipment when the vehicle passes through said toll gate and transfers the result of communication to said navigation system, and said navigation system determines whether said vehicle is now traveling on a toll road or on a common road based upon said result of communication and informs of this fact.

In the car-mounted equipment according to the present invention, furthermore, said ETC car-mounted unit transfers the content instructed by said ETC on-the-road equipment to said navigation system, and said navigation system informs said instructed content.

In the car-mounted equipment according to the present invention, furthermore, said navigation system has at least either a touch panel or a voice recognition means as an input unit and transfers the data input from said input unit to said ETC car-mounted unit, and said ETC car-mounted unit receives the data and instruction through the input unit of said navigation system.

In the car-mounted equipment according to the present invention, furthermore, said navigation system determines that said vehicle is traveling near said toll gate based upon the data related to the position of said vehicle and transfers this fact as toll gate-approaching data to said ETC car-mounted unit, and said ETC car-mounted unit is driven in response to the toll gate-approaching data from said navigation system.

In the car-mounted equipment according to the present invention, furthermore, said ETC car-mounted unit transfers the entrance toll gate passage data of the entrance toll gate that is passed through already and the present balance data to said navigation system in response to said toll gate-approaching data, and said navigation system has a toll table comprising a matrix for the exit toll gates and the entrance toll gates as a data base related to a plurality of toll gates, and, when said toll gate-approaching data indicates that an exit toll gate is approaching, calculates the toll due at said exit toll gate and a balance after the adjustment based on the entrance toll gate passage data, the toll table corresponding to said exit toll gate and said balance data.

In the car-mounted equipment according to the present invention, furthermore, said navigation system has a lane constitution comprising general lanes and ETC lanes on where the ETC on-the-road equipment is installed at every toll gate as a data base related to said plurality of toll gates, produces information to guide said vehicle to a general lane at said exit toll gate when the balance after the adjustment at said exit toll gate indicates a deficit, and produces information to guide said vehicle to an ETC lane at said exit toll gate when the balance after the adjustment at said exit toll gate indicates a black-ink balance or surpulus monetary account balance.

In the car-mounted equipment according to the present invention, furthermore, said ETC car-mounted unit executes communication with the ETC on-the-road equipment at said exit toll gate and receives a lane constitution comprising general lanes and ETC lanes on where the ETC on-the-road equipment is installed at said exit toll gate, and transmits the lane constitution at said exit toll gate to said navigation system, and said navigation system produces information to guide said vehicle to a general lane at said exit toll gate when the balance after the adjustment at said exit toll gate indicates a deficit, and produces information to guide said vehicle to an ETC lane at said exit toll gate when the balance after the adjustment at said exit toll gate indicates a black-ink balance or surplus monetary account balance.

In the car-mounted equipment according to the present invention, furthermore, said ETC car-mounted unit transmits the toll gate passage data to said navigation system when it is determined through the communication with the ETC on-the-road equipment that the vehicle has passed through a toll gate, and said navigation system stores the names of the toll gates as a data base related to said plurality of toll gates and informs the name of said toll gate by mapping based upon said toll gate passage data and said data base.

BRIEF DESCRIPTION OF THE DRAWINGS

FIG. 6 is a diagram concretely illustrating a toll table in FIG. 5;

DESCRIPTION OF THE PREFERRED EMBODIMENTS

Embodiment 1

An embodiment 1 of the present invention will now be described with reference to the drawings.

Figure 1:
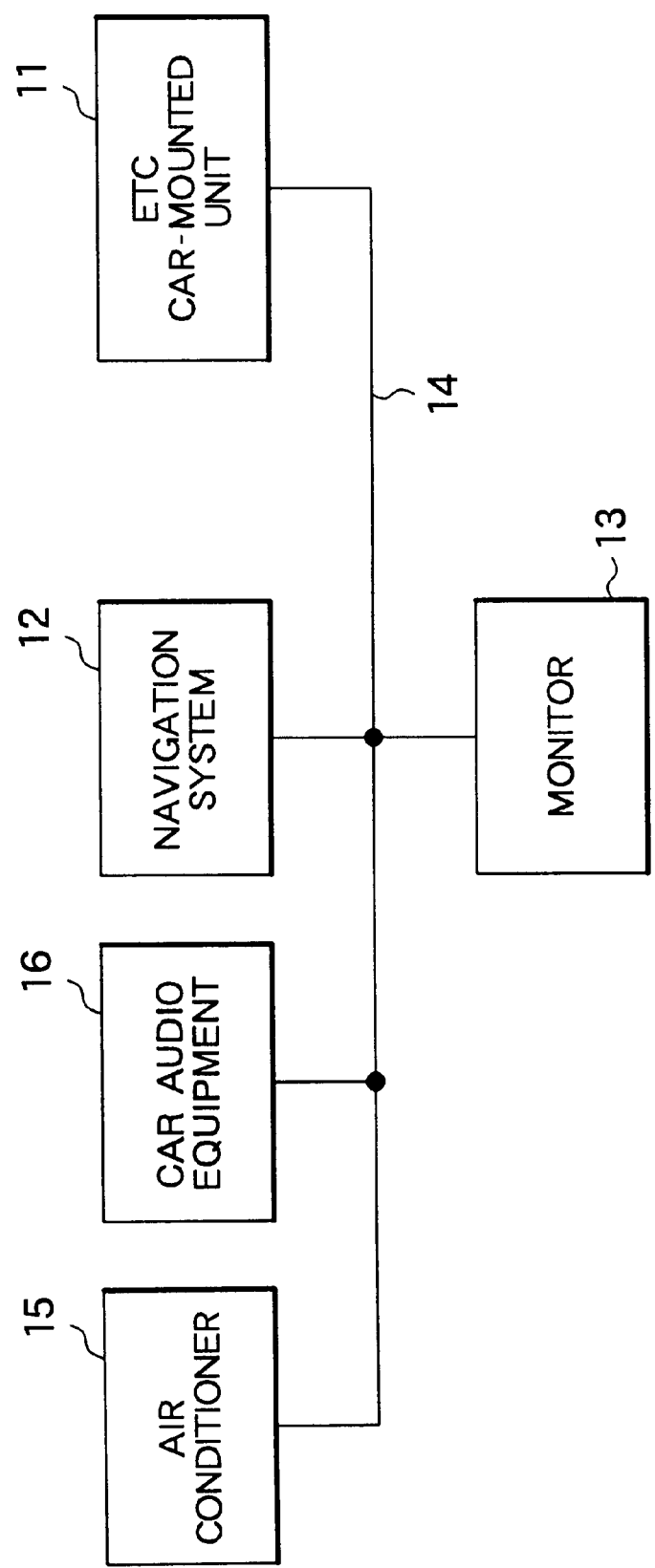
FIG. 1 is a block diagram schematically illustrating the constitution of an embodiment 1 of the present invention.
Figure 14:
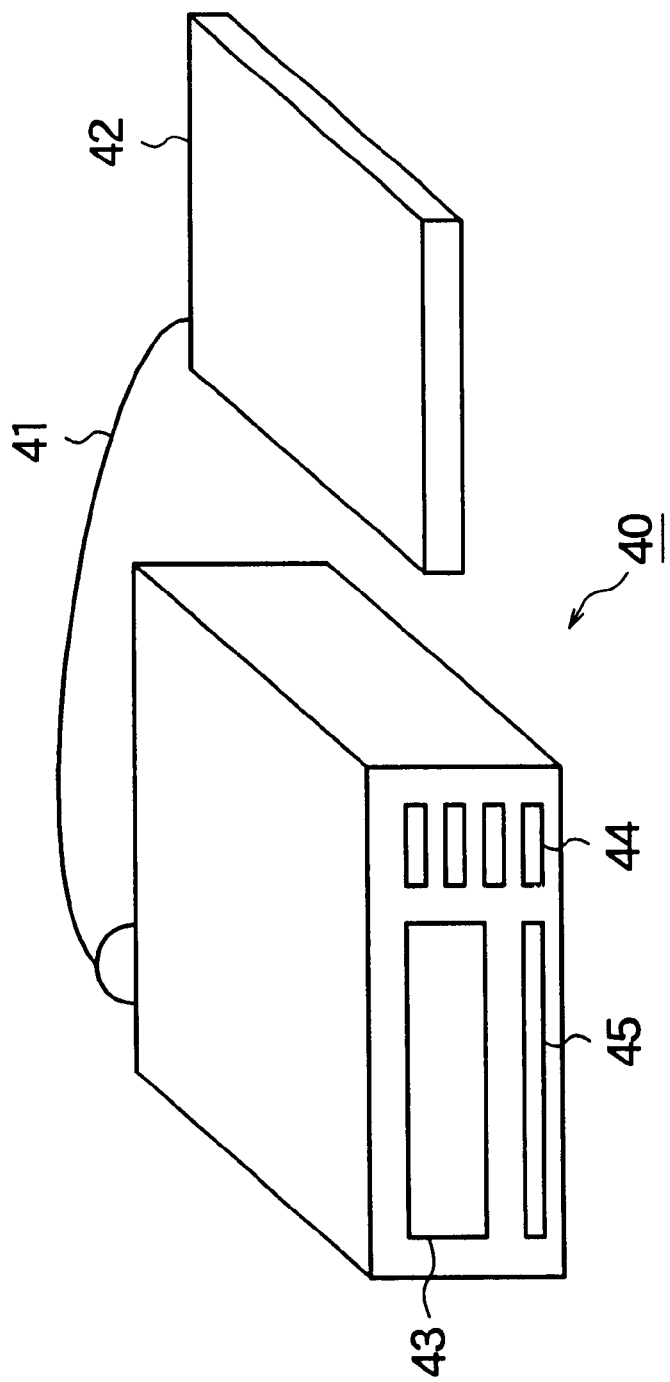
FIG. 14 is a perspective view illustrating another conventional car-mounted equipment.

FIG. 1 is a block diagram schematically illustrating the constitution according to the embodiment 1 of the present invention. In FIG. 1, an ETC car-mounted unit 11 is constituted in the same manner as the one described above (see, for example, FIG. 14).

A navigation system 12 has a monitor 13 that includes a liquid crystal display unit of a large screen and a speaker, receives electromagnetic waves from the satellite to recognize the absolute position of the vehicle, and informs the driver of at least the position of the vehicle by displaying information or by voice information through the monitor 13.

A data bus 14 connects the ETC car-mounted unit 11 and the navigation system 12 together so that they work integrally together.

That is, the ETC car-mounted unit 11 and the navigation system 12 transmit and receive data to, and from, each other through the data bus 14 to share the data.

Other car-mounted equipment such as an air conditioner 15 and a car audio equipment 16 are also connected to the data bus 14.

Figure 2:
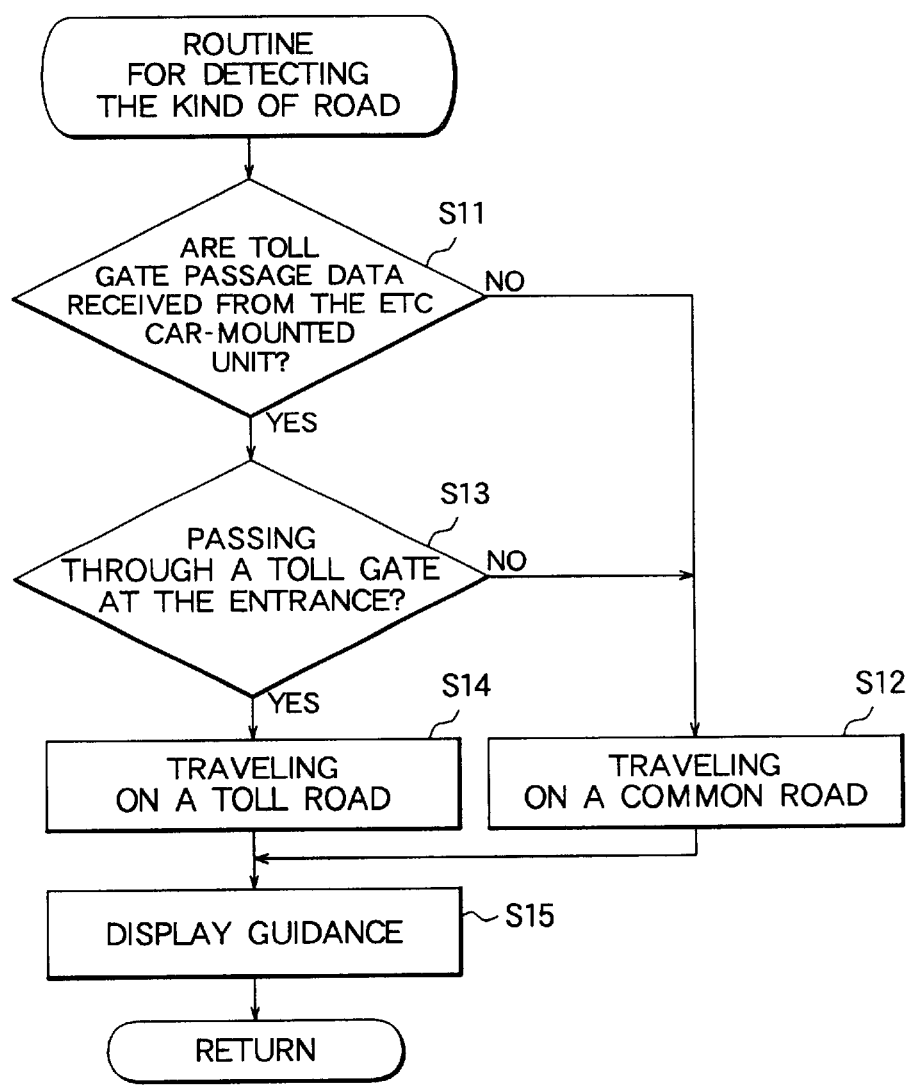
FIG. 2 is a flow chart illustrating a routine for detecting the kind of road by using a navigation system in FIG. 1.

Next, described below with reference to a flow chart of FIG. 2 is the operation according to the embodiment 1 of the invention shown in FIG. 1.

FIG. 2 shows a routine for detecting the kind of road by using the navigation system 12, and illustrates the operation for correctly discriminating whether the road on which the vehicle is traveling is a toll road or a common road.

The ETC car-mounted unit 11 executes communication with an ETC on-the-road equipment when the vehicle travels passing through a toll gate, and transfers the result of communication as toll gate passage data (data indicating the passage through a toll gate at the entrance or a toll gate at the exit) to the navigation system 12 through the data bus 14.

Then, in FIG. 2, the navigation system 12 determines whether the toll gate passage data is received from the ETC car-mounted unit 11 (step S11. When it is determined that no toll gate passage data is received (i.e., NO), the navigation system 12 so recognizes that the road on which the vehicle is now traveling is a common road (step S12), and the routine returns.

When it is determined at the step S11 that the toll gate passage data is received (i.e., YES), then, the navigation system 12 checks the content of data informed from the ETC car-mounted unit 11 and determines whether the data is the entrance toll gate passage data (or the check barrier passage data on the way of the toll road) (step S13).

When it is determined that the data is not the entrance toll gate passage data (i.e., NO), it means that the data is the exit toll gate passage data. Therefore, the routine proceeds to the step S12 where the navigation system 12 so recognizes that the vehicle is traveling on a common road.

On the other hand, when it is so determined at the step S13 that the data is the entrance toll gate passage data (or the check barrier passage data), it means that the vehicle has entered into a toll road (or traveling through the toll road), and the routine proceeds to a step S14 where it is so recognized that the vehicle is traveling through the toll road.

That is, when the entrance toll gate passage data is received, the navigation system 12 so determines that the vehicle is now traveling through the toll road. When the toll gate passage data is not received even once or when the exit toll gate passage data is received after the entrance toll gate passage data has been received, the navigation system 12 so determines that the vehicle is traveling through a common road.

Finally, the navigation system 12 displays color on a map on the monitor 13 or produces sound from the speaker to clearly inform the driver of the fact that the road on which the vehicle is now traveling is a toll road or a common road (step S15), and the routine of FIG. 2 ends.

As described above, the ETC car-mounted unit 11 and the navigation system 12 are connected together through the data bus so as to work integrally together in order to mutually utilize the data. The navigation system 12, therefore, is allowed to determine whether the vehicle is now traveling along the toll road or the common road.

That is, upon comprehending the kind of the road on which the vehicle is now traveling, it is allowed to determine whether the vehicle is traveling on an elevated toll road such as expressway or a common road under the toll road. Similarly, it is also made possible to determine the kind of the common road which may be a by-pass running along the toll road.

Relying upon the effective data related to the position (such as toll gate passage data, etc.) offered by the ETC car-mounted unit 11, the navigation system 12 detects the traveling position of the vehicle and executes the route guidance maintaining precision higher than that of the prior equipment.

Embodiment 2

In the above-mentioned embodiment 1, the toll gate passage data was transferred from the ETC car-mounted unit 11 to the navigation system 12. However, a variety of instructed contents received from the ETC on-the-road equipment may be transferred to the navigation system 12, and the instructed contents may be informed being displayed on the monitor 13 of the navigation system 12 or in the form of sound.

Upon transferring the contents instructed by the ETC on-the-road equipment to the navigation system 12 through the ETC car-mounted unit 11, as described above, it is allowed to reliably convey the instructed contents to the driver by using such functions as a liquid crystal display screen on the monitor 13 of the navigation system 12 or a voice function.

It is further possible to display large amounts of data on an enlarged easy-to-see scale by using a large-screen monitor 13 of the navigation system 12.

Upon producing a voice guidance by using the speaker of the monitor 13, furthermore, the driver is allowed to know the result of communication without almost or without at all averting his eyes from the front window and, hence, to obtain large amounts of information more easily than with the conventional equipment.

Embodiment 3

In the foregoing was described the case where the data were transferred from the ETC car-mounted unit 11 to the navigation system 12. However, the data and instruction may be transferred to the ETC car-mounted unit 11 by using an input unit of the navigation system 12.

For example, when the navigation system 12 has an input unit such as a touch panel or a voice recognition means as a monitor 13, a variety of input data (data and instructions) can be easily input to the ETC car-mounted unit 11 through the multi-functional input unit of the navigation system 12 in order to operate the ETC car-mounted unit 11 (request the display of balance, etc.).

By using the touch panel and the voice recognition means, therefore, the ETC car-mounted unit 11 can be operated from the side of the navigation system 12 offering improved operability compared to that of the prior equipment.

Embodiment 4

In the above-mentioned embodiment 1, the ETC car-mounted unit 11 was driven in response to a notice beacon from the ETC on-the-road equipment near the toll gate. It is, however, also allowable to drive the ETC car-mounted unit 11 in response to the toll gate-approaching data from the navigation system 12.

Described below is an embodiment 4 of the present invention according to which the passage near the toll gate is noticed in advance by the navigation system 2.

Figure 3:
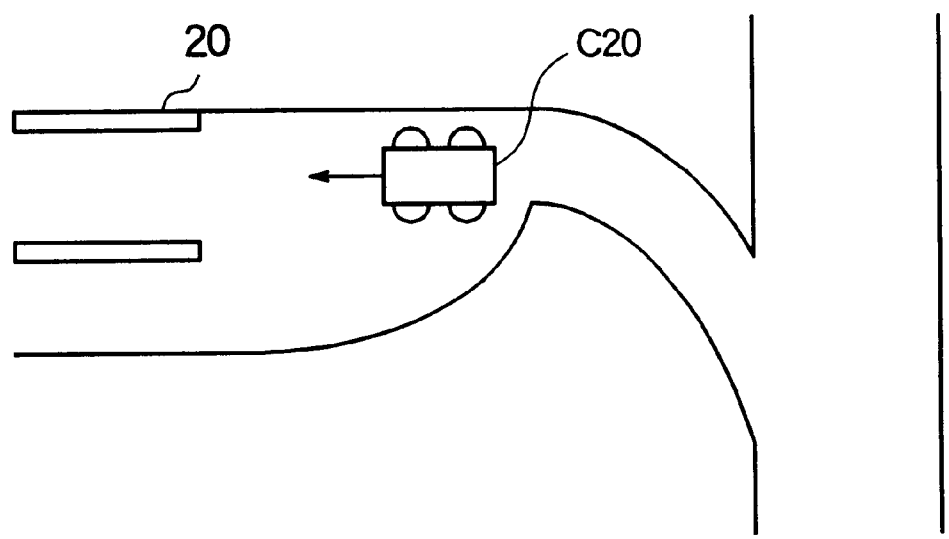
FIG. 3 is a plan view for explaining the operation according to an embodiment 4 of the present invention.
Figure 4:
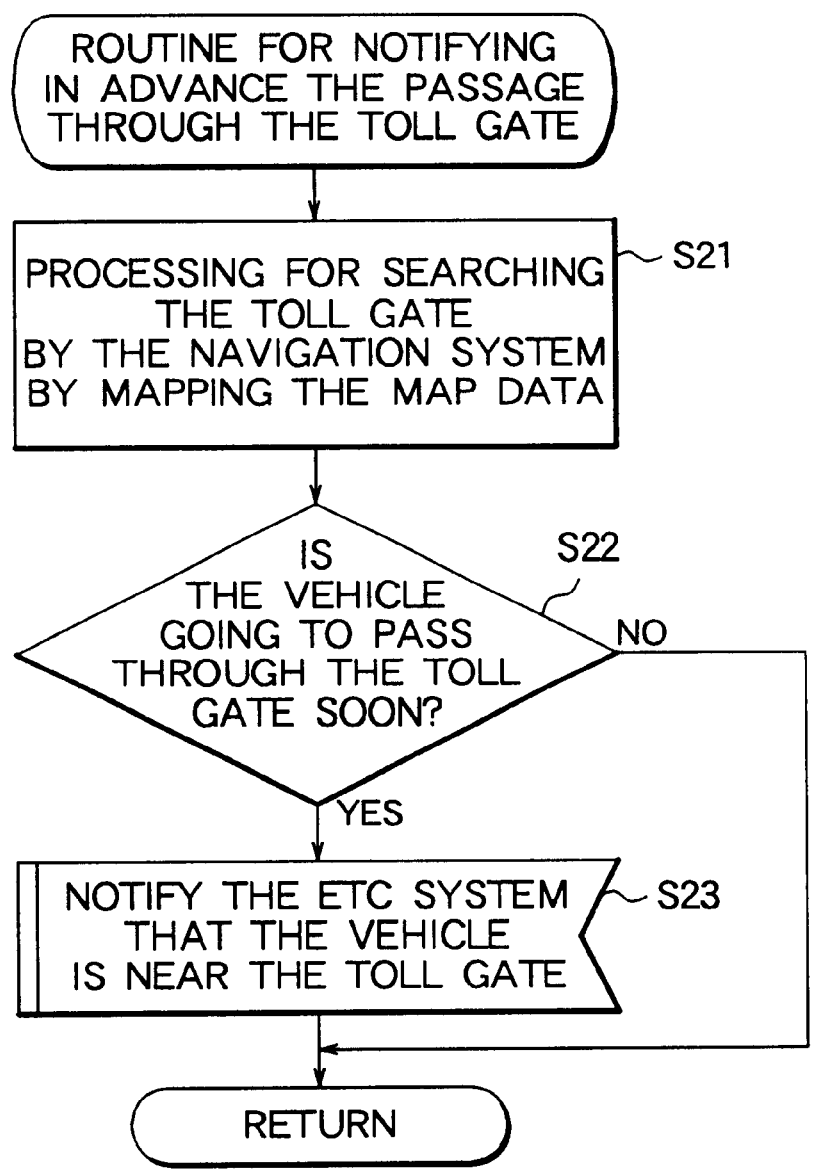
FIG. 4 is a flow chart illustrating the operation for noticing the toll gate passage data according to the embodiment 4 of the present invention.

FIGS. 3 and 4 are a plan view and a flow chart for explaining the operation for notifying the toll gate passage data according to the embodiment 4 of the present invention.

In FIG. 3, it is presumed that a vehicle C20 traveling in the direction of an arrow is mounting the ETC car-mounted unit 11 and the navigation system 12 that are formed integrally together (see FIG. 1), and is approaching a toll gate 20 to pass therethrough.

In this case, upon determining that the vehicle C20 is traveling near the toll gate 20 relying upon the position data of the toll gate 20 and the position data of the vehicle C20, the navigation system 12 on the vehicle C20 transfers in advance to the ETC car-mounted unit 11 the fact that the vehicle C20 will soon pass through the toll gate 20.

That is, in a routine for notifying in advance the passage through the toll gate of FIG. 4, the navigation system 12, first, executes the processing for searching the toll gate 20 by mapping the map data (step S21), checks the searched result, and determines whether the vehicle is going to pass through the toll gate 20 soon or not (step S22).

When it is determined that the vehicle is not expected to pass through the toll gate 20 (i.e., NO), the routine returns escaping from the processing routine of FIG. 4.

On the other hand, when it is determined at the step S22 that the vehicle is soon going to pass through the toll gate 20 (i.e., YES), the navigation system 12 notifies the ETC car-mounted unit 11 that the vehicle C20 is near the toll gate through the data bus 4 (step S23), and the routine returns.

Upon transferring the fact that the vehicle C20 has approached near the toll gate 20 (toll gate-approaching data) to the ETC car-mounted unit 11 from the navigation system 12, the ETC car-mounted unit 11 is driven in response to the toll gate-approaching data, and communication can be executed with the ETC on-the-road equipment installed at the toll gate 20.

Thus, there can be added a communication start preparation (wake up) function and a toll estimation processing function (described later) of the ETC car-mounted unit 11.

At the time of start (wake up), furthermore, no wait time is required before the system is stabilized, and the communication ends within a short period of time, enabling an increased number of the vehicles to pass through within a unit time.

The ETC car-mounted unit 11 determines that the communication is going to start with the ETC on-the-road equipment, and is driven so as to be shifted to the normal mode from the low-power-consumption mode upon receiving the toll gate-approaching data as a drive signal. It is, therefore, allowed to easily place the ETC car-mounted unit 11 itself in the low-power-consumption mode.

The preparation for starting the communication of the ETC car-mounted unit 11 needs not be executed in response to the data from the ETC on-the-road equipment. Therefore, neither the antenna for transmitting a notice beacon from the ETC on-the-road equipment nor the antenna for receiving beacon of the ETC car-mounted unit 11, is required, making it possible to decrease the cost of the equipment as a whole.

Embodiment 5

In the above-mentioned embodiment 4, the toll gate-approching data from the navigation system 12 was used as a drive signal for the ETC car-mounted unit 11. The toll gate-approching data, however, may be used as a drive signal for calculating the toll of the toll road which is due.

Described below with reference to the drawings is an embodiment 5 of the present invention in which the toll gate-approching data from the navigation system 12 is used as a drive signal for calculating the toll that is due.

Figure 7:
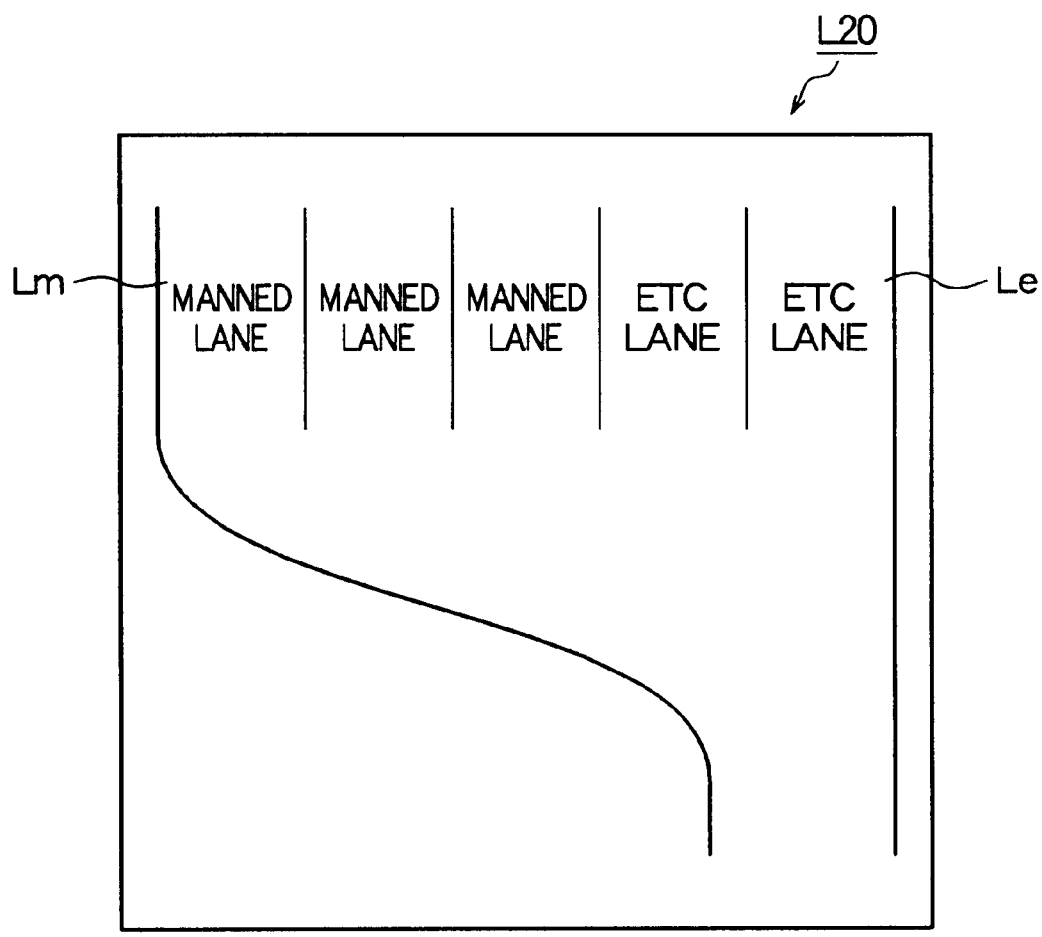
FIG. 7 is a diagram illustrating a data base of a lane constitution according to the embodiment 5 of the present invention.
Figure 8:
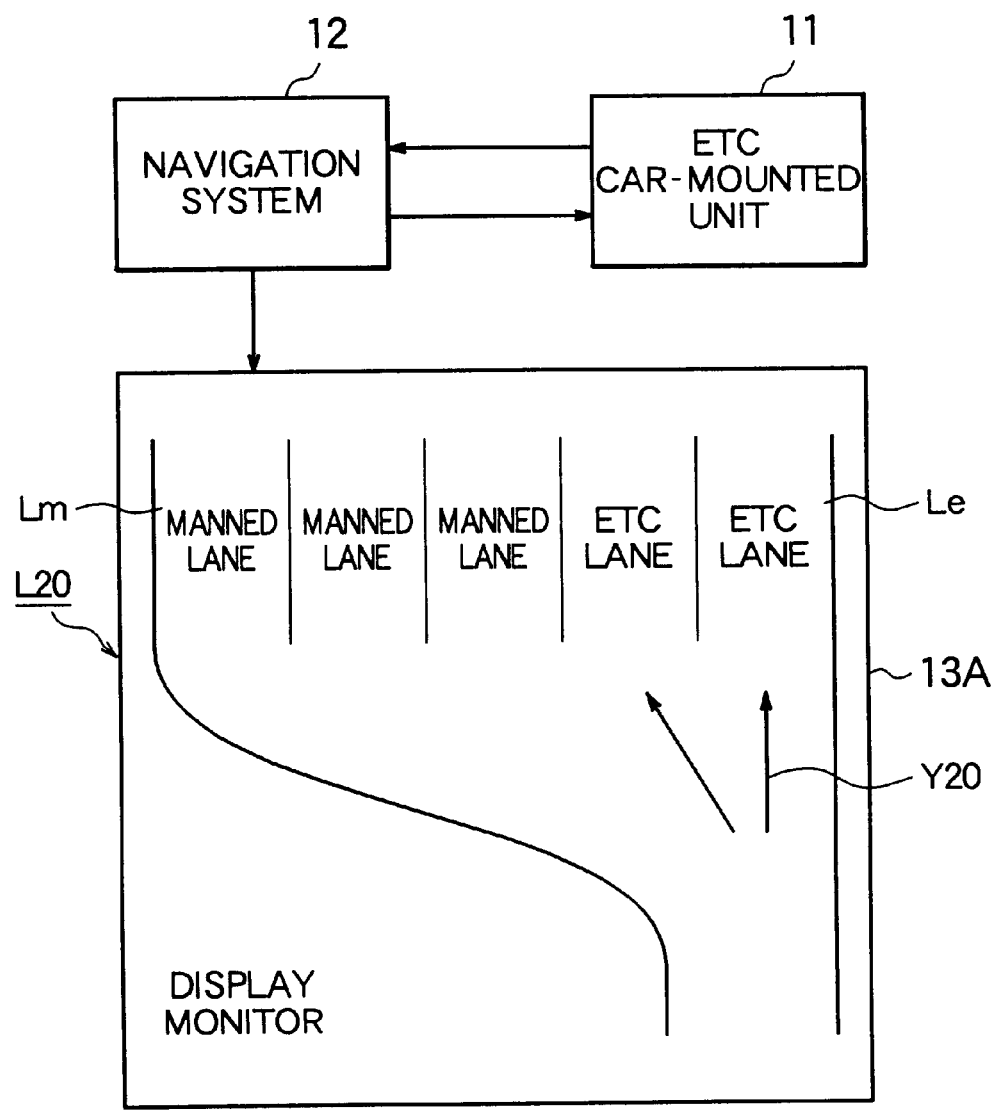
FIG. 8 is a diagram illustrating a display of a lane guide according to the embodiment 5 of the present invention.
Figure 9:
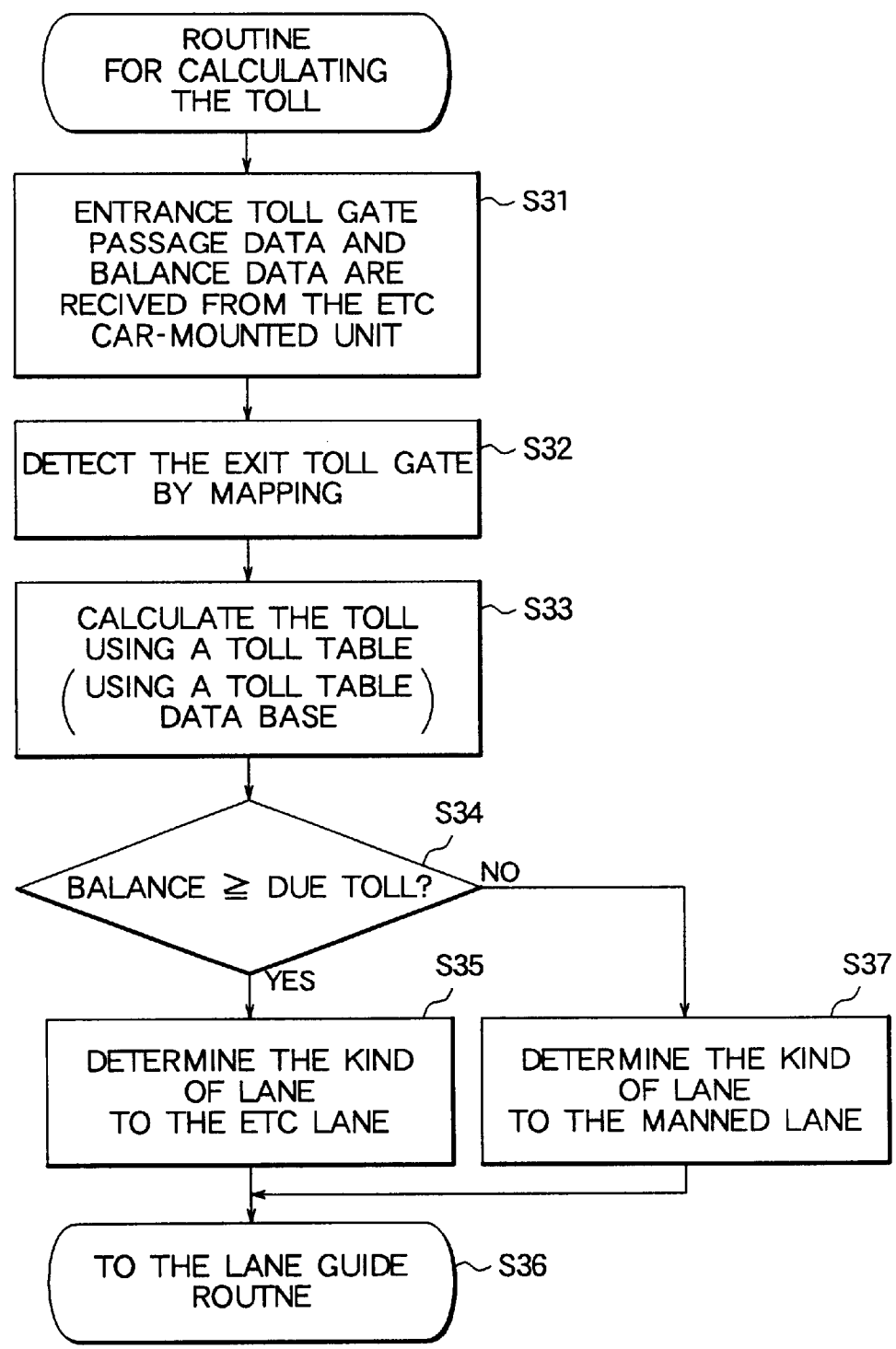
FIG. 9 is a flow chart illustrating a toll calculation routine according to the embodiment 5 of the present invention.
Figure 10:
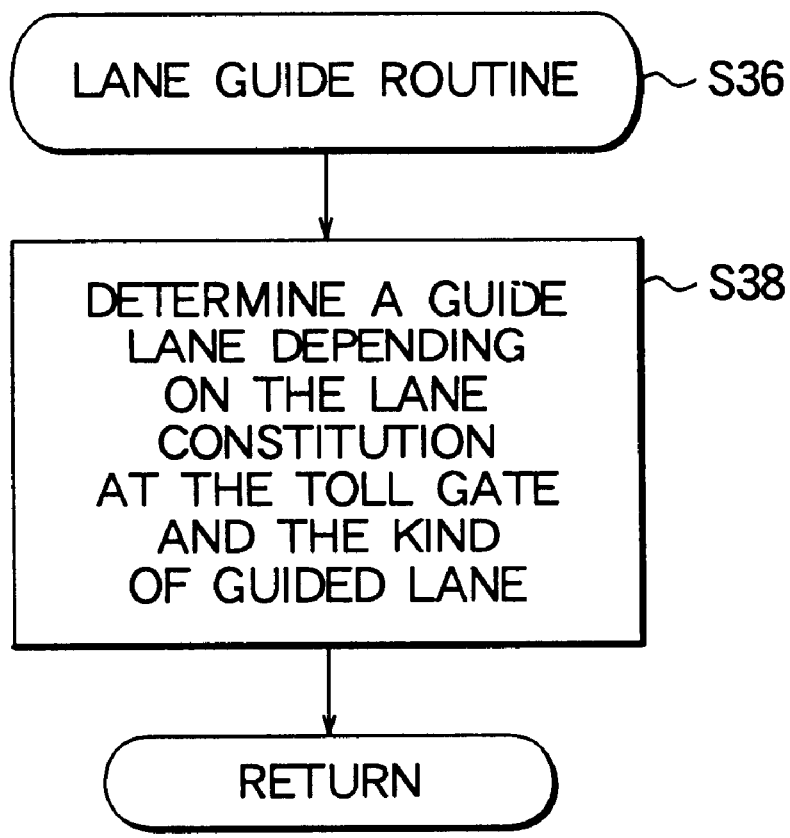
FIG. 10 is a flow chart illustrating a lane guide routine in FIG. 9.

FIGS. 5 to 8 are diagrams illustrating the embodiment 5 of the present invention, and FIGS. 9 and 10 are flow charts illustrating the operation of the embodiment 5 of the present invention.

Figure 5:
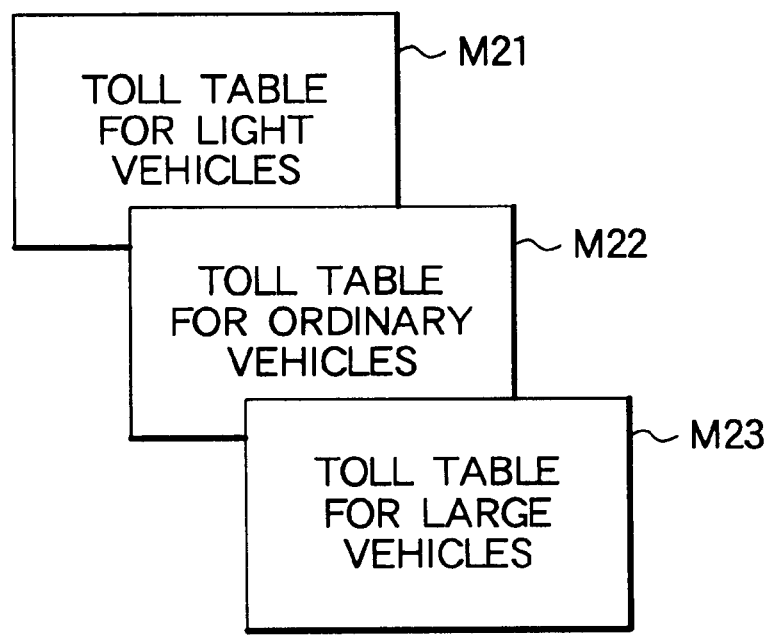
FIG. 5 is a diagram illustrating a data base of toll tables according to an embodiment 5 of the present invention.

FIGS. 5 to 7 are diagrams illustrating a data base stored in advance in the navigation system 12, wherein FIG. 5 is a table of tolls depending upon the kinds of the vehicles, FIG. 6 is a concrete data map of the table of tolls, and FIG. 7 illustrates a lane constitution that may vary depending upon the toll gate.

FIG. 8 is a diagram illustrating a lane guide table for guiding the vehicle C20 (see FIG. 3) to a lane.

FIG. 9 is a flow chart illustrating a routine for calculating the toll that is due, and FIG. 10 is a flow chart illustrating a lane guide routine based upon the toll that is due of FIG. 9 and the balance after the adjustment.

Among the toll tables M21 to M23 in FIG. 5, the toll table M21 is for light vehicles, the toll table M22 is for ordinary vehicles, and the toll table M23 is for large vehicles.

In FIG. 6, a representative toll table M20 is expressed by a matrix corresponding to the entrance toll gates and the exit toll gates together with the names A to Z of the toll gates.

In FIG. 7, a lane constitution L20 for each of the toll gates A to Z, comprises manned lanes Lm for passing general vehicles without ETC car-mounted unit and ETC lanes Le on where the ETC on-the-road equipment are arranged to permit the passage of the vehicles C20 equipped with the ETC car-mounted unit 11.

Usually, the vehicles C20 equipped with the ETC car-mounted unit 11 pass through the ETC lanes Le.

Referring to FIG. 8, the navigation system 12 displays lane guide information on the display monitor 13A based upon the present balance data and the entrance toll gate passage data of the entrance toll gate that is passed already transferred from the ETC car-mounted unit 11.

Described below is a lane guide information of when, for example, the ETC lanes Le are selected and lane guide arrows Y20 are displayed for guiding the vehicle C20, together with the lane constitution L20 of FIG. 7.

In response to the toll gate-approaching data transferred from the navigation system 12, the ETC car-mounted unit 11 transfers the entrance toll gate passage data of the entrance toll gate that is passed already and the present balance data to the navigation system 12.

The navigation system 12 has a toll table M20 (see FIG. 6) comprising a matrix corresponding to the exit toll gates and the entrance toll gates as a data base related to a plurality of toll gates. When the toll gate-approaching data indicates that a toll gate at the exit is approaching, the navigation system 12 calculates the toll which is due at the exit toll gate and the balance after the adjustment based on the entrance toll gate passage data, the toll table M20 corresponding to the exit toll gate and the balance data.

The navigation system 12 further has a lane constitution L20 (see FIG. 7) comprising manned (general) lanes Lm and ETC lanes Le on where the ETC on-the-road equipment is arranged for each of the toll gates as a data base related to a plurality of toll gates. When the balance after the adjustment at the exit toll gate becomes a deficit, the navigation system 12 produces information for guiding the vehicle C20 to a manned (general) lane Lm of the exit toll gate. When the balance after the adjustment at the exit the toll gate becomes a black-ink balance, the navigation system 12 produces information for guiding the vehicle C20 to an ETC lane Le of the exit toll gate.

Based upon the entrance toll gate passage data transferred from the ETC car-mounted unit 11, in this case, the navigation system 12 determines that the toll gate-approaching data of this time is indicating the approach of the exit toll gate, and calculates the toll due at the exit toll gate and the balance after the adjustment.

Concrete operation of the embodiment 5 of the present invention will now be described with reference to the drawings of FIGS. 5 to 8 and the flow charts of FIGS. 9 and 10.

Upon determining from the position data of the vehicle C20 that the vehicle C20 is approaching the toll gate, the navigation system 12 transfers the toll gate-approaching data to the ETC car-mounted unit 11 to drive it.

Then, the ETC car-mounted unit 11 transfers the present balance data and the entrance toll gate passage data for calculating the due toll to the navigation system 12 through the data bus 14.

In the routine for calculating the due toll of FIG. 9, the navigation system 12, first, receives the entrance toll gate passage data and the balance data transferred from the ETC car-mounted mounted unit 11 (step S31), and detects the exit toll gate corresponding to the toll gate-approaching data of this time relying on the mapping (step S32).

Then, the navigation system 12 recognizes the entrance toll gate through which the vehicle has passed from the entrance toll gate passage data, makes a reference to a toll table (e.g., toll table M20 in FIG. 6) corresponding to the exit toll gate and the entrance toll gate, and calculates the toll due at the exit toll (step S33).

In the toll table M20 of FIG. 6, for example, when the entrance toll gate is the toll gate B and the exit toll gate is the toll gate Y, then the toll due at the exit toll gate is 2300 yen.

Next, reference is made to the present balance data, and the balance is compared with the toll that is due to determine whether the balance is larger than the toll that is due (step S34). The lane in which the vehicle C20 is to be guided is determined depending upon the result of this determination.

When it is determined at the step S34 that the balance is larger than the toll that is due (i.e., YES), the vehicle C20 is allowed to pass through the ETC lane Le. Therefore, the kind of lane is determined to be the ETC lane Le (step S35), and the routine proceeds to a lane guide routine shown in FIG. 10 (step S36).

On the other hand, when it is determined at the step S34 that the balance is smaller than the toll that is due (i.e., NO), the vehicle C20 that attempts to pass through the ETC lane Le will be forced to stop because of lack of the balance. Therefore, the kind of lane is determined to be a general manned lane Lm (step S37), and the routine proceeds to the lane guide routine (step S36).

In the lane guide routine shown in FIG. 10, the navigation system 12 determines a guide lane (step S38) based on the lane constitution L20 at the exit toll gate and the kind of guided lane determined by the step S35 or S36.

As shown in, for example, FIG. 8, lane guide arrows Y20 are displayed on the display monitor 13A to guide the vehicle to the ETC lane Le, and the routine returns. In this case, the lane may be guided by voice.

As described above, the navigation system 12 recognizes the exit toll gate by mapping the data base (names of the toll gates, toll tables M21 to M23, and lane constitutions L20) that has been stored in advance and the entrance toll gate passage data stored in the ETC car-mounted unit 11, and calculates the toll that is due and the balance after the adjustment by using the toll table corresponding to the exit toll gate and the balance data before the vehicle passes through the exit toll gate.

When the vehicle C20 travels near the toll gate, furthermore, the navigation system 12 determines the name of the exit toll gate by mapping based on the map data despite no notice beacon is received.

Furthermore, the navigation system 12 starts calculating the toll that is due and the balance after the adjustment before the ETC car-mounted unit 11 really executes communication with the ETC on-the-road equipment. This makes it possible to guide a vehicle whose balance is smaller than the due toll to a general manned lane Lm well before the vehicle approaches the toll gate.

This makes it possible to prevent the vehicle whose balance is not enough from entering into the ETC lane Le, and to prevent jamming or collision from behind that may result when the vehicle stops in the ETC lane Le.

Embodiment 6

According to the above-mentioned embodiment 5, the lane constitution L20 at the exit toll gate was stored in advance as a data base for the navigation system 12. It is, however, also allowable to obtain the data related to the lane constitution through the communication between the ETC car-mounted mounted unit 11 and the ETC on-the-road equipment at the exit toll gate, and transfer the data related to the lane constitution transmitted from the ETC on-the-road equipment to the navigation system 12 through the ETC car-mounted unit 11.

Moreover, through the communication with the ETC on-the-road equipment, the ETC car-mounted unit 11 may obtain detailed lane guidance data.

In this case, upon combining the lane constitution L20 stored in advance in the navigation system 12 and the lane guidance data obtained from the ETC on-the-road equipment, the vehicle C20 can be guided in a more detailed manner based on a highly reliable toll gate constitution.

For instance, the navigation system 12 displays which one of the lanes at the toll gate the guide (instructed to pass through) lane is, based on the lane constitutions L20 at the toll gates in the data base and the lane guide (instructed to pass through) data received by the ETC car-mounted unit 11 from the ETC on-the-road equipment.

By combining the kind of lane instructed to pass through determined from the balance with the toll gate constitution in the data base, furthermore, the navigation system 12 becomes capable of guiding the lane in a more detailed manner showing the lane constitution.

This reliably prevents the driver from going into a situation in which he must forcibly change the lane right before the toll gate.

Embodiment 7

In the above-mentioned embodiment 5 as shown in FIG. 8, the lane guide only was displayed on the display monitor 13A. However, the navigation system 12 stores the names of the toll gates as a data base and, hence, the name of the exit toll gate recognized by the mapping processing may be displayed.

Moreover, the navigation system 12 may transfer the name of the toll gate that is recognized to the ETC car-mounted unit 11 together with the toll table.

It is thus allowed to display the name of the exit toll gate without the need of storing a table for specifying the names of the exit toll gates in the ETC car-mounted unit 11.

Embodiment 8

According to the above-mentioned embodiment, the name of the exit toll gate only was displayed (informed). However, the names of the toll gates may be displayed every time when they are passed through.

Described below is an embodiment 8 of the present invention which displays the names of the toll gates every time when they are passed through.

Figure 11:
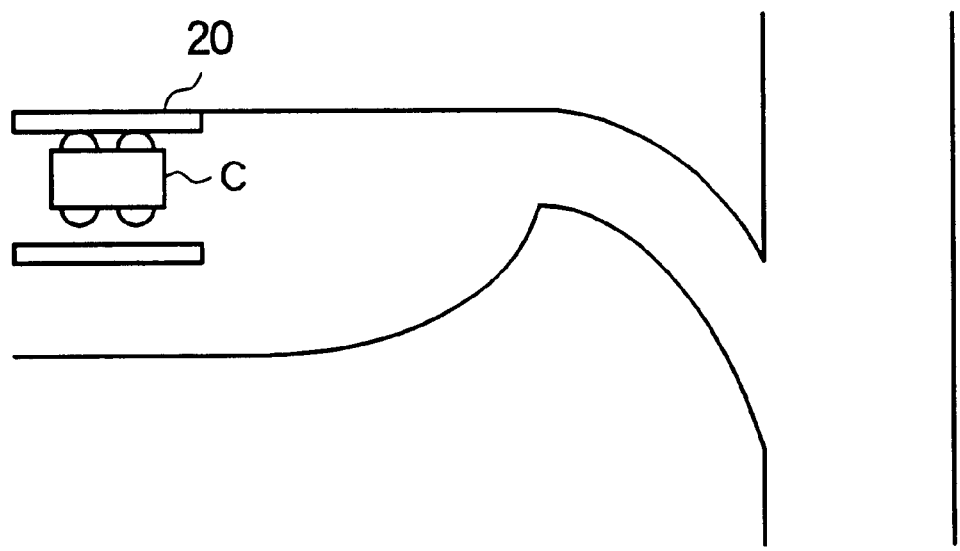
FIG. 11 is a plan view for explaining the operation according to an embodiment 8 of the present invention.

FIG. 11 is a plan view for illustrating the embodiment 8 of the present invention, wherein the toll gate 20 and the vehicle C20 are the same as those described earlier.

Figure 12:
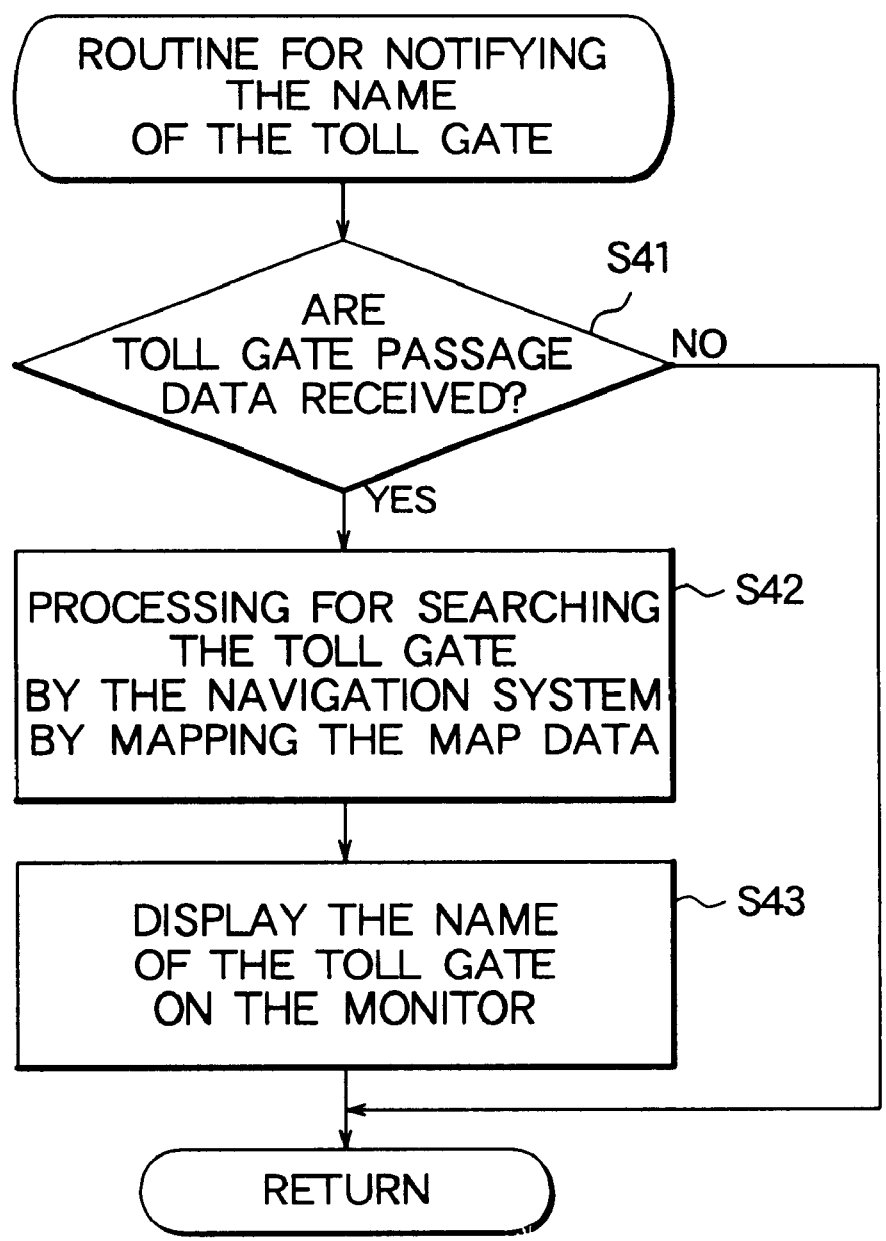
FIG. 12 is a flow chart illustrating the operation for notifying the name of a toll gate according to the embodiment 8 of the present invention.
Figure 13:
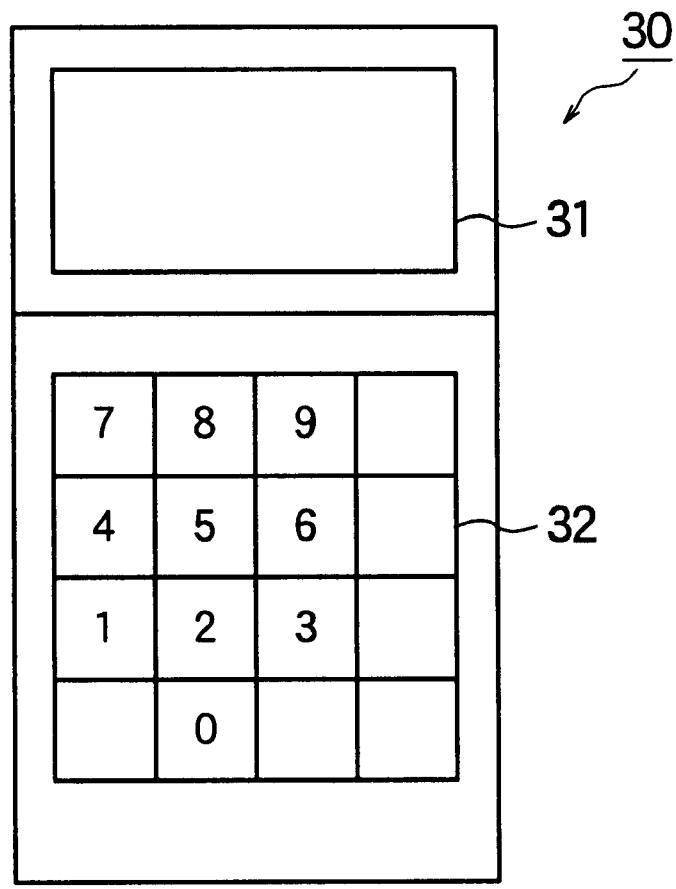
FIG. 13 is a plan view illustrating a conventional car-mounted equipment.

FIG. 12 is a flow chart of a routine for notifying the name of the toll gate according to the embodiment 8 of the invention, wherein a step S41 corresponds to the above-mentioned step S11 (see FIG. 2) and a step S42 corresponds to the above-mentioned step S21 (see FIG. 4).

In this case, the navigation system 12 stores the names of the toll gates as a data base related to a plurality of toll gates together with the map data.

When the passage through the toll gate is detected through the communication with the ETC on-the-road equipment, the ETC car-mounted unit 11 transmits the toll gate passage data to the navigation system 12 as described above.

In FIG. 12, first, the navigation system 12 determines whether the toll gate passage data are notified from the ETC car-mounted unit 11 or not (step S41). When it is so determined that no toll gate passage data is received (i.e., NO), the routine returns to assume the standby state.

When it is determined at the step S41 that the toll road passage data is received (i.e., YES), the navigation system 12 executes the processing for searching the toll gate by data mapping (step S42) based on the toll gate passage data, map data in the data base and the name of the toll gate.

The name of the toll gate obtained through the search at the step S42 is displayed (informed) on the monitor 13 as the name of the toll gate which the vehicle C20 has now passed through (step S43), and the routine goes out of the processing of FIG. 12.

By using the data base of the navigation system 12 as described above, the name of the toll gate can be automatically specified every time when the vehicle C20 passes through the toll gate. Thus, the name of the toll gate can be displayed in real time without the need of storing a conversion table of codes and names of the toll gates in the ETC car-mounted unit 11.

What is claimed is:

1. A car-mounted equipment comprising:
    an ETC car-mounted unit which executes transmission and reception to and from an ETC on-the-road equipment to at least recognize that a vehicle is approaching or passing through a toll gate;
    a navigation system which receives electromagnetic waves from a satellite to recognize the absolute position of said vehicle and communicates to a driver at least the position of said vehicle by displaying data or by producing voice data; and
    a data bus which connects said ETC car-mounted unit and said navigation system together so that said ETC car mounted unit and said navigation system work integrally together to share data;
    wherein said ETC car-mounted unit sends data to and receives data from said navigation system, and said navigation system sends data to and receives data from said ETC car-mounted unit through said data bus so as to participate in two-way data communication.

2. A car-mounted equipment according to claim 1, wherein said ETC car-mounted unit executes communication with said ETC on-the-road equipment when said vehicle passes through said toll gate and transfers a result of communication to said navigation system, and said navigation system determines whether said vehicle is now traveling on a toll road or on a common road based upon said result of communication and informs said driver of this fact.

3. A car-mounted equipment according to claim 1, wherein said ETC car-mounted unit transfers the content instructed by said ETC on-the-road equipment to said navigation system, and said navigation system informs said instructed content.

4. A car-mounted equipment according to claim 1, wherein said navigation system has at least either a touch panel or a voice recognition means as an input unit and transfers the data input from said input unit to said ETC car-mounted unit, and said ETC car-mounted unit receives the data and instruction through the input unit of said navigation system.

5. A car-mounted equipment according to claim 1, wherein said navigation system determines that said vehicle is traveling near said toll gate based upon the data related to the position of said vehicle and transfers this fact as toll gate-approaching data to said ETC car-mounted unit, and said ETC car-mounted unit is driven in response to the toll gate-approaching data from said navigation system.

6. A car-mounted equipment according to claim 5, wherein:
    said ETC car-mounted unit transfers the entrance toll gate passage data of the entrance toll gate that is passed through already and the present balance data to said navigation system in response to said toll gate-approaching data; and
    said navigation system has a toll table comprising a matrix for the exit toll gates and the entrance toll gates as a data base related to a plurality of toll gates, and, when said toll gate-approaching data indicates that an exit toll gate is approaching, calculates the toll due at said exit toll gate and a balance after the adjustment based on said entrance toll gate passage data, said toll table corresponding to said exit toll gate and said balance data.

7. A car-mounted equipment according to claim 6, wherein said navigation system has a lane constitution comprising general lanes and ETC lanes on where the ETC on-the-road equipment is installed at every toll gate as a data base related to said plurality of toll gates, produces information to guide said vehicle to a general lane at said exit toll gate when the balance after the adjustment at said exit toll gate indicates a deficit, and produces information to guide said vehicle to an ETC lane at said exit toll gate when the balance after the adjustment at said exit toll gate indicates a surplus balance.

8. A car-mounted equipment according to claim 6, wherein:

said ETC car-mounted unit executes communication with the ETC on-the-road equipment at said exit toll gate and receives a lane constitution comprising general lanes and ETC lanes on where the ETC on-the-road equipment is installed at said exit toll gate, and transmits the lane constitution at said exit toll gate to said navigation system; and said navigation system produces information to guide said vehicle to a general lane at said exit toll gate when the balance after the adjustment at said exit toll gate indicates a deficit, and produces information to guide said vehicle to an ETC lane at said exit toll gate when the balance after the adjustment at said exit toll gate indicates a surplus balance.

9. A car-mounted equipment according to claim 1, wherein:

said ETC car-mounted unit transmits the toll gate passage data to said navigation system when it is determined through the communication with the ETC on-the-road equipment that the vehicle has passed through a toll gate; and said navigation system stores the names of the toll gates as a data base related to said plurality of toll gates, and informs the name of said toll gate by mapping based upon said toll gate passage data and said data base.

* * * * *